US009484793B2

United States Patent
Kimura et al.

(10) Patent No.: US 9,484,793 B2
(45) Date of Patent: Nov. 1, 2016

(54) ELECTRICAL ROTATING MACHINE SYSTEM OR WIND TURBINE SYSTEM

(71) Applicant: Hitachi, Ltd., Chiyoda-ku, Tokyo (JP)

(72) Inventors: Mamoru Kimura, Hitachinaka (JP); Nobuhiro Kusuno, Hitachi (JP); Tomomichi Ito, Hitachinaka (JP); Tetsuo Fujigaki, Hitachi (JP); Daisuke Kori, Hitachinaka (JP); Motonobu Iizuka, Hitachi (JP); Akiyoshi Komura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 240 days.

(21) Appl. No.: 13/658,889

(22) Filed: Oct. 24, 2012

(65) Prior Publication Data
US 2013/0127172 A1 May 23, 2013

(30) Foreign Application Priority Data
Nov. 18, 2011 (JP) ................. 2011-252186

(51) Int. Cl.
*H02P 9/00* (2006.01)
*H02K 17/44* (2006.01)
*H02P 9/44* (2006.01)
(Continued)

(52) U.S. Cl.
CPC ............... *H02K 17/44* (2013.01); *F03D 7/042* (2013.01); *H02K 11/042* (2013.01); *H02K 11/33* (2016.01); *H02P 9/007* (2013.01); *H02P 9/44* (2013.01); *F03D 7/04* (2013.01); *Y02E 10/725* (2013.01)

(58) Field of Classification Search
CPC ...................................... H02P 9/007
USPC ................... 290/44, 55; 322/29, 32
See application file for complete search history.

(56) References Cited

U.S. PATENT DOCUMENTS

| 4,246,531 A | * | 1/1981 | Jordan ................. H02P 9/42 322/28 |
| 4,565,929 A | * | 1/1986 | Baskin et al. ................. 290/44 |

(Continued)

FOREIGN PATENT DOCUMENTS

| EP | 0503817 | * | 9/1992 | ............ H02K 17/36 |
| JP | 01-298933 | * | 12/1989 | ............ H02K 19/38 |

(Continued)

OTHER PUBLICATIONS

Corresponding Japanese Office Action dated May 12, 2015 with English translation (7 pages).

*Primary Examiner* — Burton Mullins
(74) *Attorney, Agent, or Firm* — Crowell & Moring LLP

(57) ABSTRACT

An electrical rotating machine system that can be easily maintained and can provide improved power generation efficiency. The electrical rotating machine system includes: a first electrical rotating machine having a first stator that has first stator windings, and a first rotor that has first rotor windings and is disposed on the internal diameter side of the first stator so as to have a gap between the internal diameter side of the first stator and the first rotor itself; a second electrical rotating machine having a second stator that has second stator windings, and a second rotor that has second rotor windings and is disposed on the internal diameter side of the second stator so as to have a gap between the internal diameter side of the second stator and the second rotor itself; and at least one power converter that is electrically connected to the first rotor windings and the second rotor windings, and configured to rotate when the first rotor rotates.

23 Claims, 8 Drawing Sheets

(51) Int. Cl.
*H02K 11/04* (2016.01)
*F03D 7/04* (2006.01)

(56) References Cited

U.S. PATENT DOCUMENTS

| | | | | |
|---|---|---|---|---|
| 4,625,160 A * | 11/1986 | Hucker | ........................... | 322/32 |
| 5,285,124 A | 2/1994 | Satake et al. | | |
| 5,796,233 A * | 8/1998 | Satake et al. | ................ | 318/705 |
| 7,088,027 B2 * | 8/2006 | Leijon et al. | ................ | 310/196 |
| 7,095,130 B2 * | 8/2006 | Ichinose | ................ | F03D 7/026 |
| | | | | 290/44 |
| 7,579,702 B2 * | 8/2009 | Park | ....................... | H02J 3/386 |
| | | | | 290/44 |
| 7,638,983 B2 * | 12/2009 | Park | ................... | H02M 5/4585 |
| | | | | 290/44 |
| 8,198,743 B2 * | 6/2012 | Anghel et al. | ................. | 290/44 |
| 2008/0157529 A1 | 7/2008 | Rivas et al. | | |
| 2011/0057446 A1 * | 3/2011 | Mayor Lusarreta | .... | F03D 9/002 |
| | | | | 290/44 |
| 2011/0193345 A1 | 8/2011 | Arinaga et al. | | |
| 2013/0069566 A1 * | 3/2013 | Pietromonaco | ............... | 318/245 |

FOREIGN PATENT DOCUMENTS

| | | | | |
|---|---|---|---|---|
| JP | 5-64402 | | 3/1993 | |
| JP | 2002-95288 A | | 3/2002 | |
| JP | 2002-136191 A | | 5/2002 | |
| JP | 2006-345585 | | 12/2006 | |
| JP | 2010-515417 | | 5/2010 | |
| WO | 2004/055959 | * | 7/2004 | ............ H02K 17/44 |
| WO | WO 2010/095240 A1 | | 8/2010 | |

* cited by examiner

IN THE CASE OF GENERATED
ELECTRIC POWER P>0

IN THE CASE OF GENERATED
ELECTRIC POWER P<0

REGION INCAPABLE OF GENERATING ELECTRIC POWER
(DC VOLTAGE COMPONENT CANNOT BE OUTPUT IN THE
VICINITY OF F0)

ELECTRICAL ROTATING MACHINE SYSTEM OR WIND TURBINE SYSTEM

BACKGROUND

The present invention relates to electrical rotating machine systems or wind turbine systems.

In recent years, power generation systems that use natural energies such as wind power have been getting a lot of attention for the sake of the prevention of global warming. There are many examples that a rotor excitation type electrical rotating machine is used for wind power.

In the case where an exciter electrical rotating machine is used, it is necessary to supply excitation power to rotor windings in a rotor that is rotating while the exciter electrical rotating machine is running. An ordinary exciter electrical rotating machine is equipped with slip rings and brushes used for supplying electric power to the rotor windings, and therefore the brushes are set up to establish contact with the slip rings to pass electric currents. However, because a power generating operation deals with a great deal of energy, if slip rings and brushes are installed to supply excitation power for the power generating operation, the brushes are rapidly worn away, therefore it is necessary to periodically maintain the brushes. However, in a wind turbine system, because it is necessary to maintain an exciter electrical rotating machine that is housed in a small space, that is, in a nacelle installed on the top of a windmill tower, a method for maintaining the exciter electrical rotating machine more easily has been required.

An example of a brushless doubly-fed electrical rotating machine is disclosed in Japanese Unexamined Patent Application Publication No. 2002-95288. This patent application publication describes the brushless doubly-fed electrical rotating machine in which a wound rotor type induction machine is connected to a fly wheel that stores electric power in the form of rotational energy; the rotor winding of the wound rotor type induction machine is directly and electrically connected to the rotor winding of an exciting wound rotor type induction machine; the rotors of both wound rotor type induction machines are mechanically connected to each other; and the stator winding of the exciting wound rotor type induction machine is connected to a power converter that is disposed outside both induction machines.

The number of poles of the wound rotor type induction machine and that of the exciting wound rotor type induction machine are different from each other, and both wound rotor type induction machines are configured in such a way that the synchronous speed of the exciting wound rotor type induction machine is higher than that of the wound rotor type induction machine.

SUMMARY

However, according the structure of the brushless doubly-fed electrical rotating machine described in Japanese Unexamined Patent Application Publication No. 2002-95288, because the rotor winding of the wound rotor type induction machine is directly and electrically connected to the rotor winding of the exciting wound rotor type induction machine, a DC voltage to be applied in the vicinity of the synchronous speed cannot be applied, (because a voltage generated at a rotor windings is an AC voltage). The above situation is shown in FIG. 13. In other words, due to the above structure, the power generating operation in the vicinity of the synchronous speed cannot be performed, with the result that the power generation efficiency is lowered.

An object of the present invention is to provide an electrical rotating machine and the like that can be easily maintained and can provide an improved power generation efficiency.

As a means to solve the above-described problem, provided is an electrical rotating machine system that includes: a stator having stator windings; a rotor that has rotor windings and is disposed on the internal diameter side of the stator so as to have a gap between the internal diameter side of the stator and the rotor itself; a second stator having second stator windings; a second electrical rotating machine having a second rotor that has a second rotor windings and is disposed on the internal diameter side of the second stator so as to have a gap between the internal diameter side of the second stator and the second rotor itself; and a power converter that is electrically connected to the rotor windings and the second rotor windings. In addition, the power converter is configured to rotate when the rotor rotates.

According to the present invention, an electrical rotating machine that can be easily maintained and can provide an improved power generation efficiency is materialized.

DETAILED DESCRIPTION

Hereinafter, the preferred embodiments in which the above-described present invention is implemented will be described with reference to the drawings. Here, descriptions of the following preferred embodiments will be made for illustrative only, therefore it is not intended by these descriptions that the scope of the present invention is limited to such specific embodiments.

First Embodiment

A first embodiment will be described with reference to FIG. 1 to FIG. 5. A structure described in this embodiment below is particularly suitable for a doubly-fed electrical rotating machine with the output power of several hundred kilowatts to several dozen megawatts.

Figure 1:
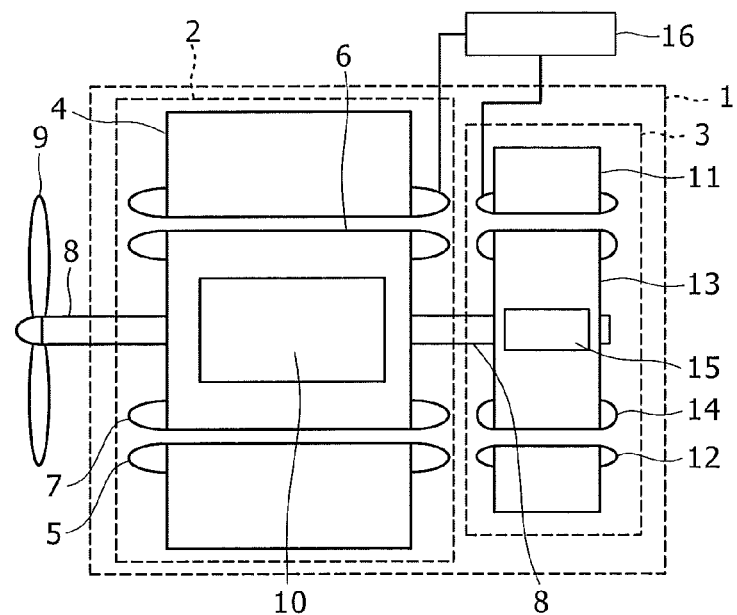
FIG. 1 is a cross-section view of an electrical rotating machine according to a first embodiment along the axis of an electric generator.

As shown in FIG. 1, an electrical rotating machine system 1 according to the present invention is equipped with an electrical rotating machine 2 that works as a main electric generator to send generated electric power to an electric power system 16, and an exciter electrical rotating machine 3.

The electrical rotating machine 2 includes: a stator 4; a rotor 6 disposed on the internal diameter side of the stator 4 so as to have a gap between the internal diameter side of the stator 4 and the rotor 6 itself; three-phase stator windings 5 that are two-tieredly wound in slots made in the stator 4 in a short pitch winding manner; three-phase rotor windings 7 that are two-tieredly wound in slots made in the rotor 6 in a full pitch winding manner; and a power converter 10 that is disposed in the rotor 6 and connected to the rotor windings 7. The three-phase stator windings 5 are disposed 120 degrees apart from each other on a circumference of the three-phase stator 4, and the three-phase rotor windings 7 are also disposed 120 degrees apart from each other on a circumference of the three-phase rotor 6.

In addition, the exciter electrical rotating machine 3 includes: a stator 11; a rotor 13 disposed on the internal diameter side of the stator 11 so as to have a gap between the internal diameter side of the stator 11 and the rotor 13 itself; three-phase stator windings 12 that are two-tieredly wound in slots made in the stator 11 in a short pitch winding manner; three-phase rotor windings 14 that are two-tieredly wound in slots made in the rotor 13 in a full pitch winding manner; and a power converter 15 that is disposed in the rotor 13 and connected to the rotor windings 14. The three-phase stator windings 12 are disposed 120 degrees apart from each other on a circumference of the three-phase stator 11, and the three-phase rotor windings 14 are also disposed 120 degrees apart from each other on a circumference of the three-phase rotor 13. The number of magnetic poles of the exciter electrical rotating machine 3 is set to be different from that of the electrical rotating machine 2, and therefore the rotational velocities of the rotor 6 and rotor 13 are different from each other if the rotor 6 and the rotor 13 respectively run at the synchronous frequency.

In this embodiment, in order that electric power can be transferred between the power converter 10 and the power converter 15, both converters are connected to each other by DC connection. If the power converter 10 and the power converter 15 are connected to each other by AC connection, it is necessary that each power converter has an AC-DC-AC converter, but because both converters are connected to each other by the DC connection in this embodiment, each of the power converters 10 and 15 has only to convert an alternate current to a direct current or vice versa, therefore functions that each power converter has to be equipped with can be halved.

The power converters 10 and 15 controls the electrical rotating machine 2 that runs as a main electric generator so that the rotor 6 of the electrical rotating machine 2 generates electric power of an ideal commercial frequency (in other words, so that the rotor 6 rotates at the synchronous speed), but, to that end, it is necessary to obtain information whether the electrical rotating machine 2, which is a control target, is generating the electric power of the ideal commercial frequency or not (in other words, information about how much the rotational velocity of the rotor 6 is). To put it concretely, the voltage, current, and the like of the system have to be obtained. Because the power converters 10 and 15 are respectively disposed in the rotors 6 and 13 that are rotating when the electrical rotating machine system 1, it is effective for the information to be transmitted via wireless communication. Therefore, in this embodiment, the power converters 10 and 15 are configured to be respectively connected to receivers capable of transmitting information via wireless communication.

In addition, FIG. 1 is a drawing showing how the electrical rotating machine system 1 according to this embodiment is mounted on a wind turbine system. A rotor 9 that rotates while receiving the wind, and a shaft 8 that is connected to the rotor 9 and at the same time, works as a rotation axis for both of rotor 6 and rotor 13 are also depicted in FIG. 1. The rotor 6 and the rotor 13 have a shaft 8 as a common rotation axis and they rotate at the same rotational velocity in accordance with the rotation of the shaft 8. Because both rotors rotate in the state of being fixed to the same shaft, it is guaranteed that they rotate around the same axis and at the same rotational velocity, and it is materialized that the power converters 10 and 15 respectively disposed in the rotors 6 and 13 do not rotate relative to both rotors. Therefore, loads such as kinks applied to wirings that are used for connecting both power converters can be reduced.

In addition, in this embodiment, the frequency of magnetic field generated per rotation is made higher by increasing the number of magnetic poles. As a result, the frequency of the magnetic field obtained in this embodiment is similar to that obtained when a rotor with a smaller number of magnetic poles are rotated at a higher rotational velocity. Therefore, the rotor 9 and the electrical rotating machine system 1 are connected to each other without a speed-up gear therebetween. By not using a speed-up gear (in other words, by adopting a gearless configuration), there are no losses and no noises associated with a speed-up gear, and at the same time, maintenance of a speed-up gear becomes unnecessary, therefore the effective operation of the wind turbine system can be achieved, and the maintenance of the wind turbine system also becomes easy. The rotational energy of the rotor 9 is transmitted as electric energy to the electric power system 16 via the rotation of the rotor. Here, although description in each embodiment has been made or will be made under the assumption that each electrical rotating machine system is a gearless system, it goes without saying that the description can be applied to a system that is equipped with a speed-up gear. The stator windings 5 of the electrical rotating machine 2 and the stator windings 12 of the exciter electrical rotating machine 3 are connected to the electric power system 16. Because an AC current with a commercial frequency passes through the electric power system 16, the voltage in the electric power system 16 changes in terms of time, and induced currents are generated in the rotor windings 14 in accordance with the number of the magnetic poles and the rotational velocity of the rotor 13 by the rotation of the rotor 13 of the exciter electrical rotating machine 3. The rotor windings 14 are connected to the rotor windings 7 of the electrical rotating machine 2 via the power converters 10 and 15; hence an exciting current for the electrical rotating machine 2 can be covered by the induced currents generated by the rotation of the rotor windings 14. As a result, it becomes possible to pass the exciting current through the rotor windings 7 without slip rings and brushes, hence the maintenance of the brushes in which whether the brushes are worn away or not is checked becomes unnecessary.

A method for controlling a brushless DFG and an electric power flow in the brushless DFG according to this embodiment configured as described above will be described with reference to FIG. 2 to FIG. 4.

Figure 2:
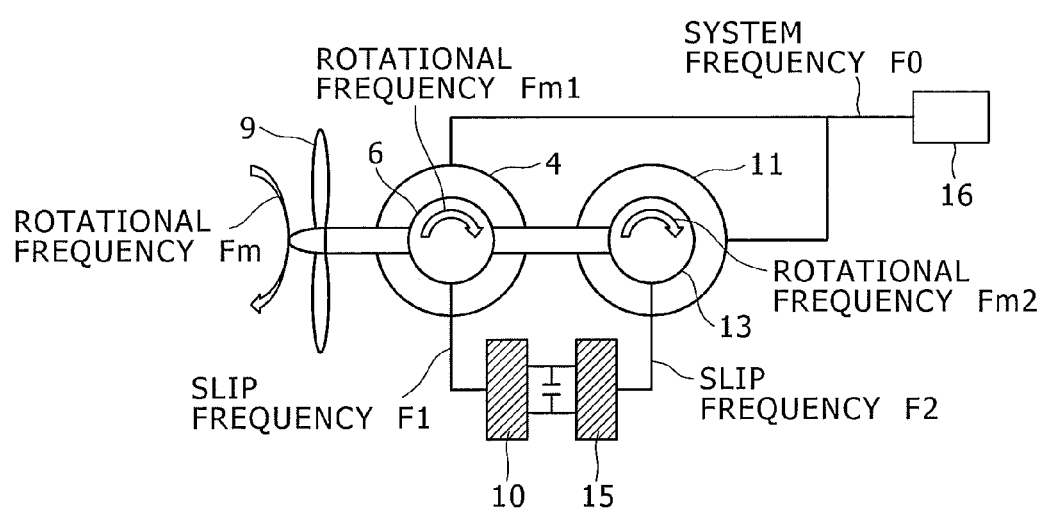
FIG. 2 is a diagram for explaining the electric energy flow of the electrical rotating machine system according to the first embodiment.

In FIG. 2, the power converter 10 and the power converter 15 are depicted in such a way that both converters are respectively disposed outside the electrical rotating machine 2 and the exciter electrical rotating machine 3 for convenience of explanation, but actually they are respectively disposed inside the rotors 6 and 13. Here, it will be assumed that the rotational frequency of the rotor 9 and the rotational frequency of the shaft 8 (both frequencies are equal to each other because a speed-up gear is not used) are Fm, the electric frequency of the rotor 6, which is determined in association with the number of the magnetic poles the rotor 6 has, is Fm1, and the electric frequency of the rotor 13, which is determined in association with the number of the magnetic poles the rotor 13 has, is Fm2.

Figure 3:
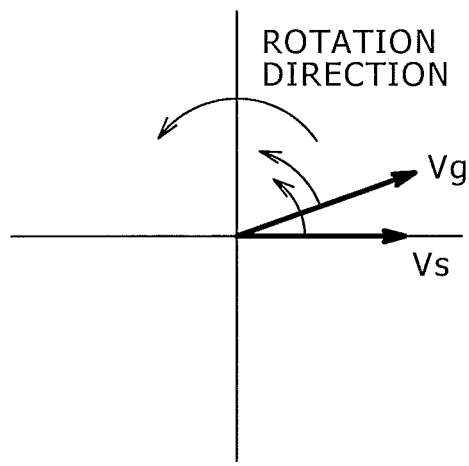
FIG. 3 is a diagram showing the relation between the phase of an induced voltage at a stator and the phase of a power system voltage in the case of generated electric power P>0.
Figure 4:
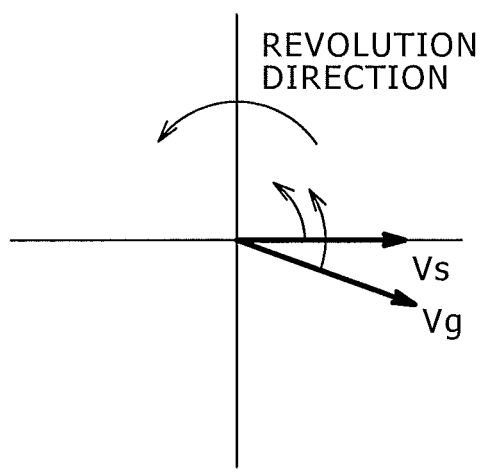
FIG. 4 is a diagram showing the relation between the phase of an induced voltage at the stator and the phase of the power system voltage in the case of the generated electric power P<0.

As shown in FIG. 3 and FIG. 4, there are two cases about the relation between the phase of an induced voltage Vg on the stator side of an electric generator and the phase of a power system voltage Vs that is applied to the stator: one is a case where the phase of the induced voltage Vg on the stator side of the electric generator is ahead; and the other is a case where the phase of the power system voltage Vs that is applied to the stator is ahead. As shown in FIG. 3, in the case where the phase of the induced voltage Vg on the stator side of the electric generator is ahead of the phase of the power system voltage Vs that is applied to the stator, the electric generator supplies electric power to the system. In other words, in the case where the phase of the induced voltage Vg on the stator side of the electric generator is ahead of the phase of the power system voltage Vs that is applied to the stator, the stator supplies the electric power to the system. On the other hand, as shown in FIG. 4, in the case where the phase of the induced voltage Vg on the stator side of the electric generator is behind the phase of the power system voltage Vs that is applied to the stator, the system supplies electric power to the stator. Therefore, the phase of an induced voltage Vg on the stator side of the electrical rotating machine 2 that is required to always supply generated electric power to the system is controlled so as to be ahead of the phase of the power system voltage Vs, and the phase of an induced voltage on the stator side of the exciter electrical rotating machine 3 is controlled so as to be ahead of or behind the phase of the power system voltage Vs depending on circumstances as described later. In addition, in the case where the phase of the induced voltage Vg on the stator side of the electric generator is equal to the phase of the power system voltage Vs that is applied to the stator, there is no transmission of electric power between the electric generator and the system.

In addition, in order to steadily generate a predetermined amount of electric power, even when the rotor of the electrical rotating machine 2 rotates at a rotational frequency different from the synchronous speed, the rotational velocity of a rotating magnetic field generated by the rotor of the electrical rotating machine 2 is required to be always equal to the system frequency F0. If the above relation cannot be met, the rotational frequency Fm1 of the rotating magnetic field slips from the system frequency F0. Therefore, the above described relation that the phase of an induced voltage Vg on the stator side of the electrical rotating machine 2 is ahead of the phase of the power system voltage Vs that is applied to the stator cannot be steadily maintained, which makes it impossible for the electrical rotating machine 2 to steadily supply electric power to the system 16.

The power system synchronization of the rotational frequency of the rotating magnetic field can be achieved by supplying an exciting current having a frequency component equivalent to a slip frequency (a frequency difference between the system frequency F0 and the rotational frequency) F1 to the rotor 6 of the electrical rotating machine 2 via the power converters 10 and 15. The slip frequency is given by an equation F1=F0−Fm1.

First, a case where the rotational frequency Fm1 of the rotor 6 of the electrical rotating machine 2 is lower than the frequency F0 of the power system voltage will be explained. In this case, electric power that has a frequency of a voltage corresponding to the difference between the frequency F0 of the power system voltage and the rotational frequency Fm1 of the rotor 6 of the electrical rotating machine 2 (the slip frequency F1) is supplied from the power converter 10 to the rotor 6 of the electrical rotating machine 2.

In this case, because effective electric power is supplied from the power converter 10 to the electrical rotating machine 2, it is necessary for the exciter electrical rotating machine 3 to supply electric power to the rotor 6 of the electrical rotating machine 2 via the power converters 10 and 15. Therefore, it is necessary that the exciter electrical rotating machine 3 receives electric power from the system side to its stator 11 and supplies electric power from its rotor 13 to the power converters 10 and 15. In other words, it is necessary to control the exciter electrical rotating machine 3 so that the phase of the voltage Vg of the stator 11 of the exciter electrical rotating machine 3 is behind the phase of the power system voltage Vs. If the exciter electrical rotating machine 3 is controlled as described above, the stator 11 receives electric power from the system 16 side, and can cause the rotor 13 to generate electric power. Subsequently, the electric power generated by the rotor 13 is converted into an exciting current having a frequency component equivalent to the slip frequency F1 via the power converters 10 and 15, and the exciting current can be supplied to the rotor 6 of the electrical rotating machine 2. Consequently, the power system synchronization of the rotational frequency of the rotating magnetic field is achieved.

Next, a case where the rotational frequency Fm1 of the rotor 6 of the electrical rotating machine 2 is equal to the frequency F0 of the power system voltage will be explained. In this case, because the slip frequency is zero, a DC exciting current, which has no frequency components, has only to be supplied to the rotor 6 of the electrical rotating machine 2. In addition, it is all right that the exciter electrical rotating machine 3 receives electric power from the system only for compensating for a conduction loss at the rotor 6 of the electrical rotating machine 2 and a loss at the power converters.

Figure 5:
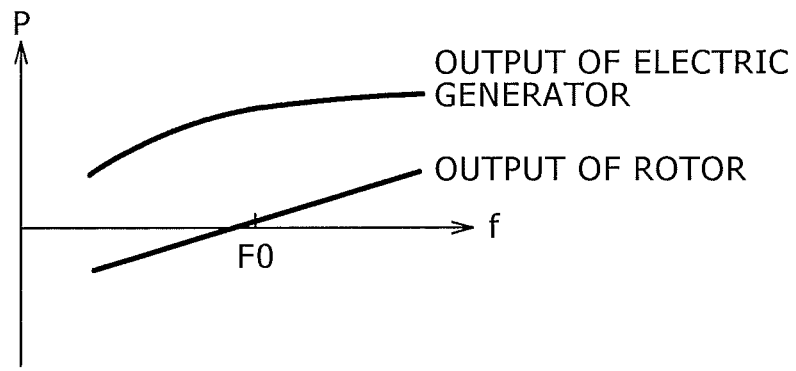
FIG. 5 is a graph showing the relation between a frequency and the generated electric power according to the first embodiment.

Even in this case, because it is necessary for the exciter electrical rotating machine 3 to supply electric power to the electrical rotating machine 2, the relation between the phase of the voltage Vg of the rotor 4 of the exciter electrical rotating machine 3 and the phase of the voltage Vs of the power system voltage has to be a relation that the phase of the voltage Vg is ahead of the phase of the voltage Vs as shown in FIG. 3. In this case, the generated electric power applied to the power converters 10 and 15 are AC electric power. This generated electric power cannot be directly supplied to the electrical rotating machine 2 as an exciting current because the exciting current has to be a DC current. Because a power converter can output a voltage of an arbitrary frequency including a DC voltage by controlling switching patterns and timings of switching elements, the generated electric power that is supplied from the rotor of the exciter electrical rotating machine 3 to the power converter 15 can be converted into DC electric power, and in addition to that, with the use of another power converter 10, the DC electric power can be converted into a DC current with a desired voltage. By applying the DC exciting voltage to the electrical rotating machine 2, the power generation can be continued even at the synchronous speed as shown in FIG. 5.

Next, a case where the rotational frequency Fm1 of the rotor 6 of the electrical rotating machine 2 is higher than the frequency F0 of the power system voltage Vs will be explained. In this case, in order to steadily generate a predetermined amount of electric power, it is also required that the rotational frequency Fm1 of the rotating magnetic field generated by the rotor 6 of the electrical rotating machine 2 is always equal to the system frequency F0.

This power system synchronization of the rotational frequency of the rotating magnetic field can be achieved by supplying a current having the magnitude of a frequency component equivalent to the slip frequency F1 from the rotor of the electrical rotating machine 2 to the exciter electrical rotating machine 3 via the power converters 10 and 15. In addition, also in this case, the rotor 13 of the exciter electrical rotating machine 3, the power converters 10 and 15, and the rotor 6 of the electrical rotating machine 2 are connected to each other, and an exciting voltage is applied to the rotor 6 of the electrical rotating machine 2.

In this case, in other words, the exciter electrical rotating machine 3 has to bring out electric power from the rotor 6 of the electrical rotating machine 2 via the power converters 10 and 15. Therefore, it is necessary that the power converters 10 and 15 supply electric power to the rotor 13 of the exciter electrical rotating machine 3, and the stator 11 of the exciter electrical rotating machine 3 supplies electric power to the system. This case is different from the above two cases, and because the direction in which the electric powers are transmitted is opposite to the direction in the above two cases, it is necessary to control the exciter electrical rotating machine 3 so that the phase of the voltage Vg of the stator 11 of the exciter electrical rotating machine 3 is ahead of the phase of the power system voltage (as shown in FIG. 4). By controlling the exciter electrical rotating machine 3 as described above, it becomes possible that the electric power brought out from the rotor 6 of the electrical rotating machine 2 is supplied to the rotor 13 of the exciter electrical rotating machine 3 via the power converters 10 and 15, and then the electric power is supplied to the system 16 from the stator 11 of the exciter electrical rotating machine 3. Therefore, the power system synchronization of the rotational frequency of the rotating magnetic field of the electrical rotating machine 2 can be achieved by supplying a current having a frequency component equivalent to the slip frequency F1 to the rotor 13 of the exciter electrical rotating machine 3 via the power converters 10 and 15.

In addition, in this case, the power converters 10 and 15 generates a slip frequency F2 for the exciter electrical rotating machine 3 so that the rotational frequency of a rotating magnetic field generated by the rotor of the exciter electrical rotating machine 3 becomes equal to the system frequency. Therefore, the power system synchronization of the exciter electrical rotating machine 3 is also achieved.

According to this embodiment, the frequency of a magnetic field generated per rotation of a rotor is made higher by increasing the number of magnetic poles. As a result, the frequency of the magnetic field obtained in this embodiment is similar to that obtained when a rotor with a smaller number of magnetic poles are rotated at a higher rotational velocity. Therefore, the rotor 9 and the electrical rotating machine system 1 are connected to each other without a speed-up gear therebetween. By not using a speed-up gear, there are no losses and no noises associated with a speed-up gear, and the effective operation of the electrical rotating machine system can be achieved, and at the same time, the maintenance of a speed-up gear is unnecessary of course. Particularly, in the case where this electrical rotating machine system is applied to a wind turbine system, the amount of the maintenance performed on the top of a tower can be reduced, which brings about an advantage for the wind turbine system.

In addition, in this embodiment, because the electrical rotating machine system is configured in such a way that generated electric power is transmitted from the rotor windings 14 of the rotating rotor 13 to the rotor windings 7 of the rotor 6 as an exciting power source, it becomes possible to pass an exciting current through the rotor windings 7 without slip rings and brushes, thereby the maintenance of changing the worn brushes becomes unnecessary.

In addition, in this embodiment, because the power converters 10 and 15 are disposed between the rotor windings 7 and the rotor windings 14, AC generated electric power for excitation applied from the rotor 13 to the power converters 10 and 15 can be converted into DC electric power via the power converters 10 and 15, which enables power generation to be continued even at the synchronous speed. Therefore, the power generation efficiency can be improved.

Here, in this embodiment, wireless communication is used for information transmission to the power converters 10 and 15, and because the amount of energy required for this information transmission is not so large, the degrees of wears of brushes and slip rings are small. Therefore, it is conceivable that slip rings that are connected to each power converter and rotate along with the corresponding rotor, and brushes that make contact with the slip rings are installed.

Second Embodiment

Figure 6:
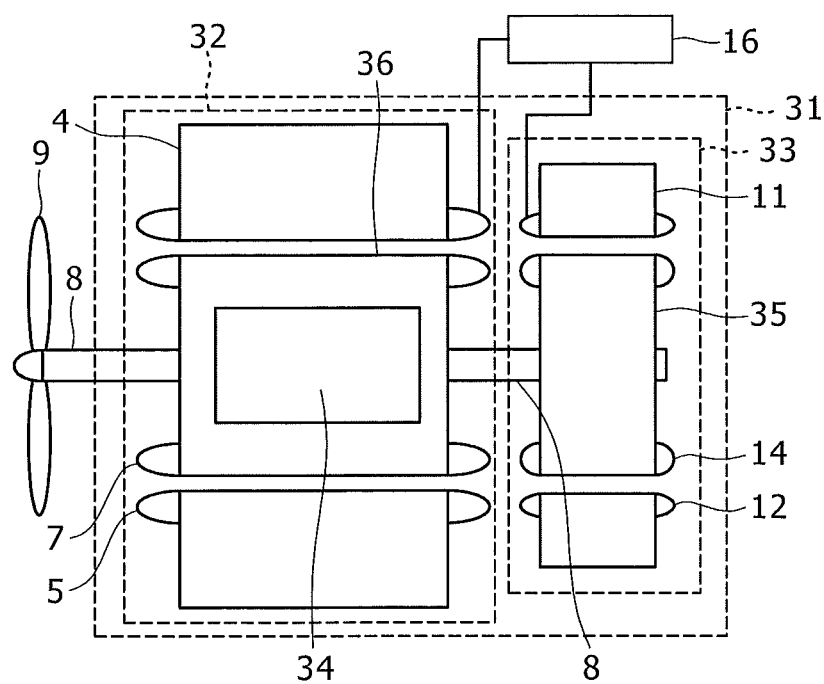
FIG. 6 is a cross-section view of an electrical rotating machine according to a second embodiment along the axis of an electric generator.

A second embodiment will be described with reference to FIG. 6. Hereinafter, descriptions about items that are the same as those already-described in the first embodiment will be omitted.

An electrical rotating machine 31 is equipped with an electrical rotating machine 32 and an exciter electrical rotating machine 33. In addition, the electrical rotating machine 32 includes: a stator 4; and a rotor 36 disposed on the internal diameter side of the stator 4 so as to have a gap between the internal diameter side of the stator 4 and the rotor 36 itself; and the exciter electrical rotating machine 33 includes: a stator 11; and a rotor 35 disposed on the internal diameter side of the stator 11 so as to have a gap between the internal diameter side of the stator 11 and the rotor 35 itself.

In the first embodiment, the power converters 10 and 15 respectively take their shares of functions of power conversion, and the power converters 10 and 15 are respectively disposed in the rotor 6 of the electrical rotating machine 2 and the rotor 13 of the exciter electrical rotating machine 3, but in this embodiment, a power converter 34 is disposed in the rotor 36 of the electrical rotating machine 32 in the form of the power converters 10 and 15 being integrated into the power converter 34. Because the power converters 10 and 15 are integrated into the power converter 34, all the functions both power converters 10 and 15 perform are performed by the power converter 34.

Although the power converter 34 is disposed in the electrical rotating machine in this embodiment, it is conceivable that the power converter 34 is disposed in the exciter electrical rotating machine. However, because the electrical rotating machine is more spacious than the exciter electrical rotating machine, it is preferable to house the power converter 34 in the electrical rotating machine.

Third Embodiment

Figure 7:
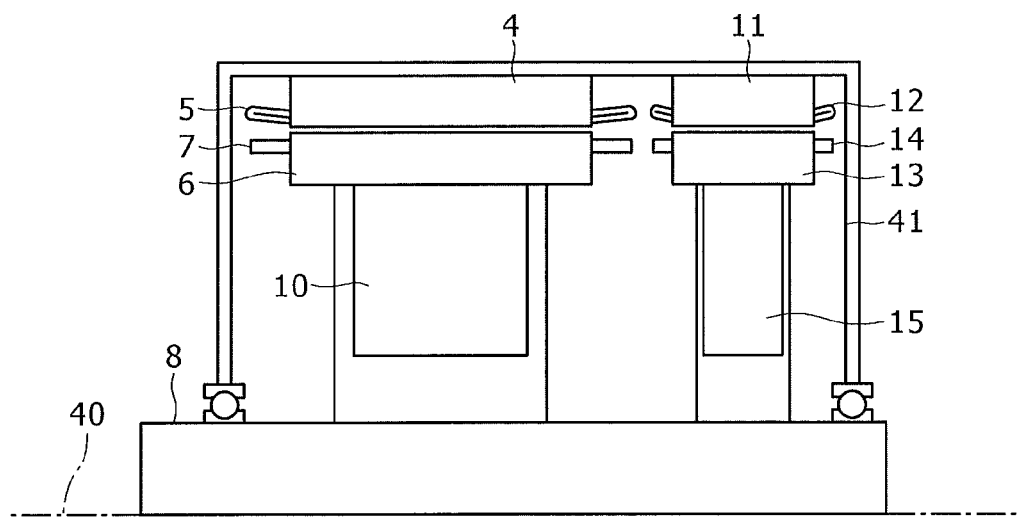
FIG. 7 is an upper half of a cross-section view of an electrical rotating machine along the axis of an electric generator for explaining a third embodiment.

A third embodiment will be described with reference to FIG. 7. Hereinafter, descriptions about items that are the same as those already-described in the above embodiments will be omitted. FIG. 7 is a drawing showing an upper cross-section view of this embodiment. In other words, this embodiment has a constitution that is given by rotating FIG. 7 about the center of a rotation axis 40.

As shown in FIG. 7, an electrical rotating machine 2 and an exciter electrical rotating machine 3 can be housed in a common frame 41, although this common frame 41 has not been described in the above-described two embodiments. By housing the electrical rotating machine 2 and the exciter electrical rotating machine 3 in the common frame 41, intermediate bearings 53 can be omitted unlike a fourth embodiment that has two frames for respectively housing the electrical rotating machine 2 and the exciter electrical rotating machine 3. The fourth embodiment will be described later. As a result, the electrical rotating machine system according to this embodiment becomes shorter in the direction of the rotation axis, which leads to the downsizing of the entirety of the electrical rotating machine system.

Fourth Embodiment

Figure 8:
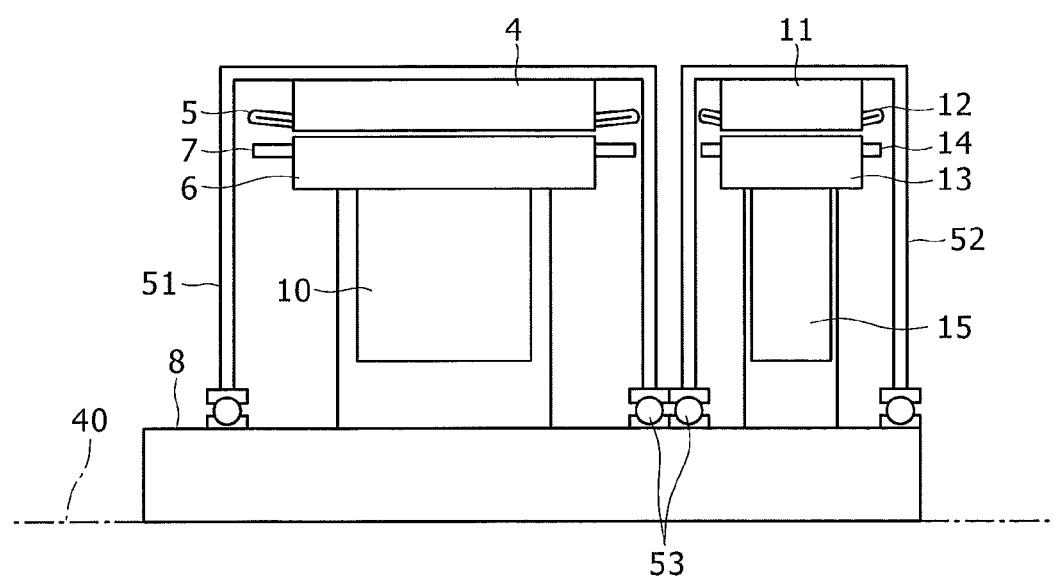
FIG. 8 is an upper half of a cross-section view of an electrical rotating machine along the axis of an electric generator for explaining a fourth embodiment.

A fourth embodiment will be described with reference to FIG. 8. A difference between this embodiment and the third embodiment is that an electrical rotating machine 2 and an exciter electrical rotating machine 3 is respectively housed in a frame 51 and a frame 52 that are independent from each other in this embodiment instead of being housed in a common frame. As shown in this embodiment, the electrical rotating machine 2 and the exciter electrical rotating machine 3 can be respectively housed in the frame 51 and frame 52 that are independent from each other.

Fifth Embodiment

Figure 9:
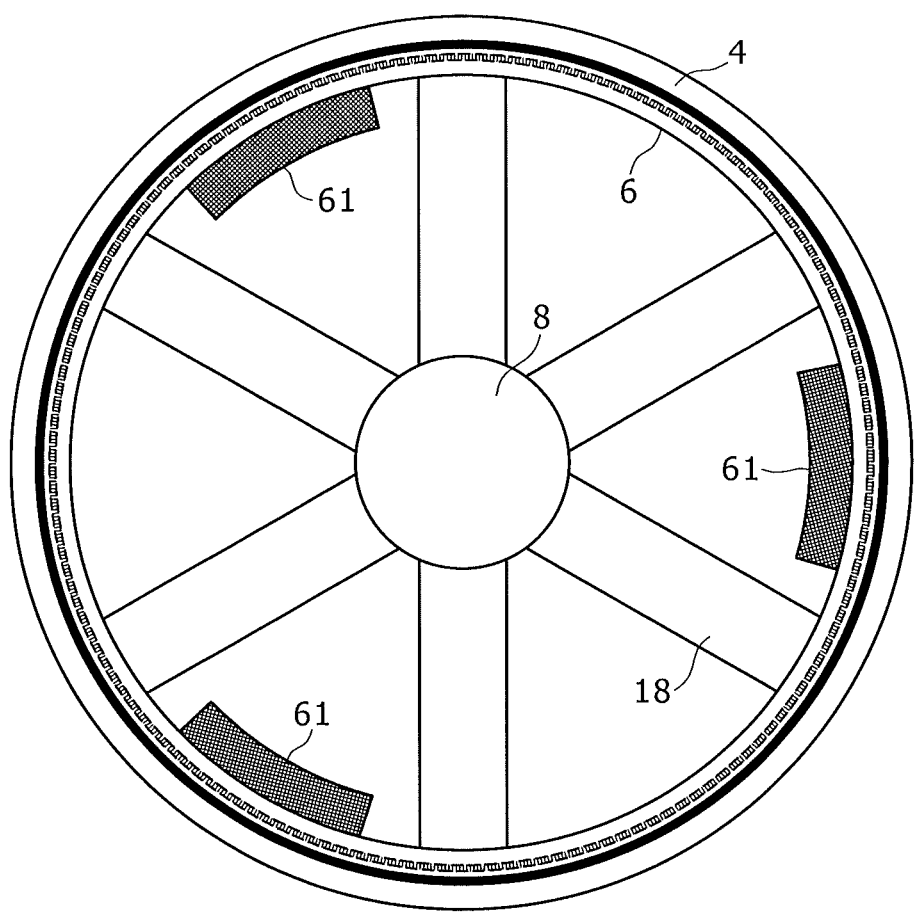
FIG. 9 is a cross-section view along the radial direction of a rotor for explaining a fifth embodiment.

A fifth embodiment will be described with reference to FIG. 9. An embodiment 5 to an embodiment 7 will be respectively described with the use of radial cross-section views that are respectively depicted along the radial directions of corresponding rotors. Hereinafter, descriptions about items that are the same as those already-described in the above embodiments will be also omitted. In each of the above-described embodiments, descriptions have been made about the case where an electrical rotating machine does not use a speed-up gear. However, in the case where the speed-up gear is not used, it is necessary that the rotational frequency of a rotating magnetic field is in synchronization with the system frequency while the rotational velocity of a shaft is kept to be moderate, thereby the electrical rotating machine has to become a multipole machine such as a machine having the number of stator slots 720 and the number of rotor slots 540. In the case where the electrical rotating machine is a multipole machine, the machine becomes large so as to house a number of poles, thereby, in order to trim the weight of the electrical rotating machine, a shaft is not made by shaving, but a ready-made shaft member is connected to a ready-made rotor with spiders 18 each of which has minimum necessary strength to transmit torque. In this case, a lot of spaces are generated inside the rotor. Therefore, power converter modules 61 are installed in these spaces, especially on the internal diameter side of the rotor. Because the internal diameter side of the rotor is cylindrical, the power converter modules have circular arc structures to fit into the internal diameter side of the rotor.

A power converter used for a rotor can be divided into three modules because the converter is used for three phase windings of the rotor. In this case, the power converter modules 61 are evenly installed between spiders 18 in the rotor with 120 degrees angularly apart from each other in the circumferential direction, thereby the weight imbalance when the rotor 6 rotates is inconspicuous, and a vibration associated with the rotation of the rotor 6 does not occur. In addition, because the power converter modules 61 are installed inside the rotor 6 (not outside the rotor 6), centrifugal forces generated at the power converter modules 61 can be supported by the rotor 6, which is desirable in terms of the structural strength of the power converter modules 61.

Sixth Embodiment

Figure 10:
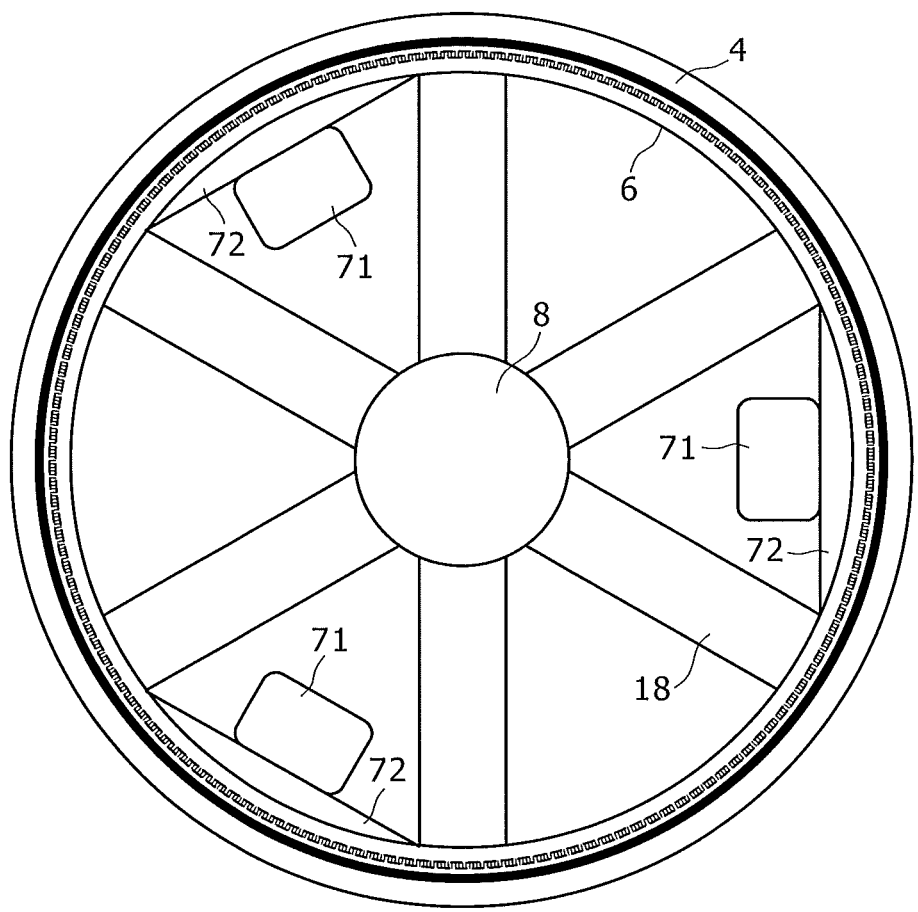
FIG. 10 is a cross-section view along the radial direction of a rotor for explaining a sixth embodiment.

A sixth embodiment will be described with reference to FIG. 10. A difference between this embodiment and the fifth embodiment is that there are portions that support power converter modules 71 inside the rotor, and that the shapes of the power converter modules themselves in this embodiment are different from those in the fifth embodiment. Items other than the above are the same as those in the fifth embodiment, and descriptions about those items will be omitted here.

In the fifth embodiment, because the internal diameter side of the rotor 6 is cylindrical, it is necessary for the power converter modules to have circular arc structures. Therefore, there is a possibility that it takes comparatively much time to produce the power converter modules. To cope with this problem, planarly processed parts 72 are installed on the circumference of the rotor 6, so that it becomes unnecessary for the power converter modules 71 to have circular arc structures, which leads to an improvement in efficiency of producing the power converter modules 71.

Seventh Embodiment

Figure 11:
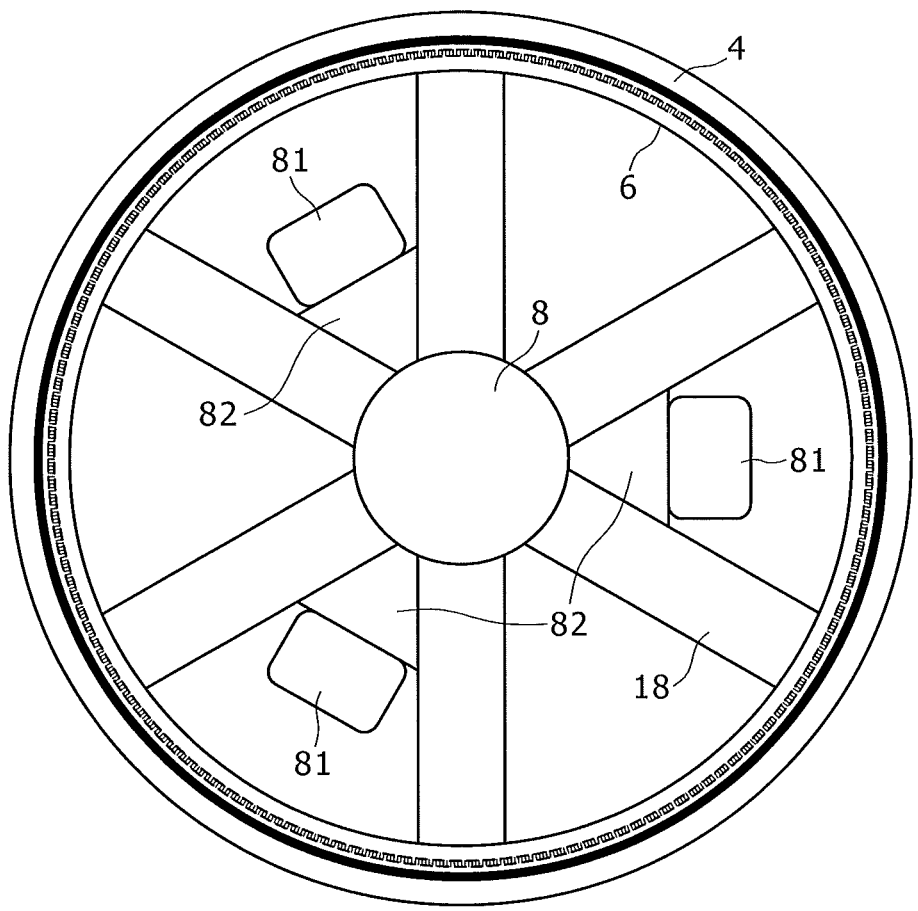
FIG. 11 is a cross-section view along the radial direction of a rotor for explaining a seventh embodiment.

A seventh embodiment will be described with reference to FIG. 11. A difference between this embodiment and the sixth embodiment is that each power converter module 81 is fixed to a planarly processed part 82 that is installed on the internal diameter side within a rotor (not on the internal diameter side of the rotor), and more particularly, it is desirable that the planarly processed part 82 is installed at a position that is nearer to the internal diameter side within the rotor in the radial direction of the rotor than the middle point of the corresponding radius of the rotor in order to reduce a centrifugal force applied to each power converter module 81. Items other than the above are the same as those in the sixth embodiment, and descriptions about those items will be omitted here.

As an example of disposition of a component within the rotor, it is conceivable that the planarly processed parts 82 are installed on the internal diameter side within the rotor, and the power converter modules 81 are respectively disposed on the planarly processed parts 82 as shown in this embodiment. In this case, there is a merit in that, because the external diameter of the rotor of a several megawatt multi-pole machine is 4 meters to 10 meters, and there is a big difference between a centrifugal force in the case of each power converter module 81 being disposed on the external diameter side and a centrifugal force in the case of each power converter module 81 being disposed on the internal diameter side within the rotor, disposing each power converter module 81 on the internal diameter side within the rotor can reduce a centrifugal force applied to each power converter module 81.

Heretofore, some typical cases where power converters are disposed within a rotor have been described in the fifth embodiment to the seventh embodiment. However, it goes without saying that the disposition of power converters are not limited to these specific types of dispositions, and various types of dispositions of the power converters may be made.

Eighth Embodiment

Figure 12:
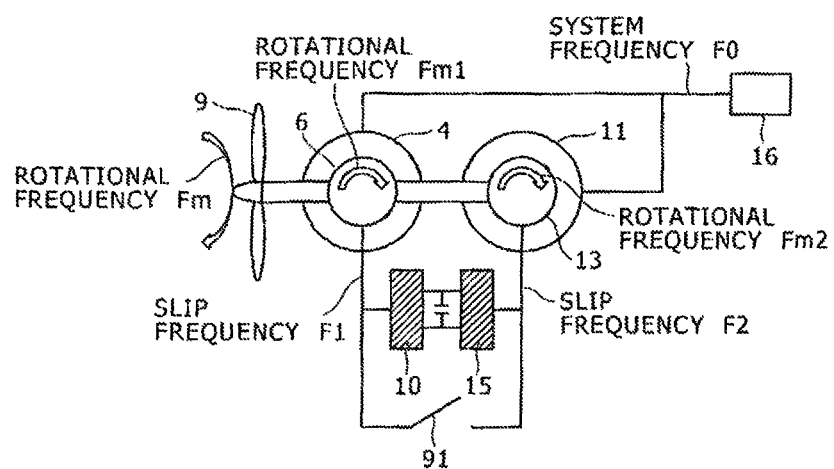
FIG. 12 is a diagram for explaining the electric energy flow of an electrical rotating machine system according to an eighth embodiment.
Figure 13:
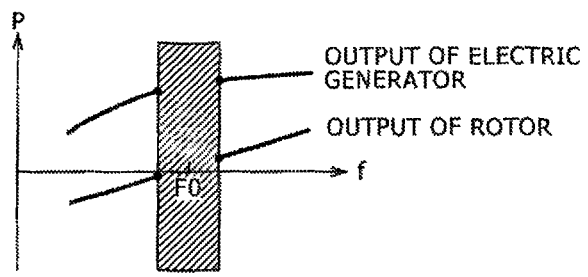
FIG. 13 is a graph showing the relation between a frequency and generated electric power according to a publicly known example.

An eighth embodiment will be described with reference to FIG. 12. In this embodiment, a circuit breaker 91 is installed, and a circuit passing the circuit breaker 91 is connected in parallel with a circuit passing a power converter 10 and a power converter 15 that are installed in a rotor. Due to such a configuration, an excess electric power can be prevented from passing through the power converters when a system breaks down. In other words, the circuit passing the circuit breaker 91 can play a role of a protection circuit. Items other than the above are the same as those in the first embodiment, and redundant descriptions about those items will be omitted.

What is claimed is:

1. An electrical rotating machine system comprising:
   a first electrical rotating machine having
      a first stator that has first stator windings, and
      a first rotor that has first rotor windings and is located on the internal diameter side of the first stator so as to have a gap between the internal diameter side of the first stator and the first rotor itself;
   a second electrical rotating machine having
      a second stator that has second stator windings, and
      a second rotor that has second rotor windings and is located on the internal diameter side of the second stator so as to have a gap between the internal diameter side of the second stator and the second rotor itself; and
   at least one power converter that is electrically connected to the first rotor windings and the second rotor windings, and configured to rotate when the first rotor rotates, wherein
      the at least one power converter controls a switching element,
      the first stator windings and the second stator windings are connected to an electric power system,
      each of the stator windings are connected to an electrical power system, and
      a frequency of a voltage corresponding to a difference between a voltage frequency of the power system and a rotational frequency of the first and second rotors is supplied from the at least one power converter to the first and second rotors.

2. The electrical rotating machine system according to claim 1, wherein the at least one power converter is located in the first rotor.

3. The electrical rotating machine system according to claim 2, wherein the at least one power converter is divided into three power converter modules, and the three power converter modules are located in the first rotor and/or in the second rotor with 120 degrees angularly apart from each other in the circumferential direction.

4. The electrical rotating machine system according to claim 2, wherein the first rotor and the second rotor are fixed to the same shaft, and the first rotor and the second rotor rotate with the shaft as a rotation axis.

5. The electrical rotating machine system according to claim 4, wherein the first rotor and the second rotor are located on the same axis, and rotate at the same velocity.

6. The electrical rotating machine system according to claim 1, wherein the at least one power converter is located in the second rotor.

7. The electrical rotating machine system according to claim 1, wherein the at least one power converter is located in both rotor and second rotor.

8. The electrical rotating machine system according to claim 7, wherein a circuit is installed in parallel with a circuit that passes through the at least one power converter between the first rotor windings and the second rotor windings, and the circuit in parallel with the circuit that passes through the at least one power converter has a circuit breaker.

9. The electrical rotating machine system according to claim 1, wherein the first electrical rotating machine and the second electric machine are housed in a common frame.

10. The electrical rotating machine system according to claim 1, wherein a receiver that is capable of transmitting information by wireless is connected to the at least one power converter.

11. The electrical rotating machine system according to claim 1, further comprising:
    a first spider that connects the rotor and a shaft;
    a second spider that connects the second rotor and the shaft, wherein;
       the at least one power converter is fixed in contact with the internal diameter side of the iron core of the first rotor and/or the internal diameter side of the iron core of the second rotor.

12. The electrical rotating machine system according to claim 1, further comprising:
    a first spider that connects the rotor and a shaft;
    a second spider that connects the second rotor and the shaft, wherein
       the internal circumferential surface of the first rotor and/or the second rotor are/is formed as a planar surface; and
       the at least one power converter is fixed in contact with the planar surface of the planar part located on the internal circumferential surface of the rotor or fixed in contact with the planar surface of the planar part located on the internal circumferential surface of the second rotor.

13. The electrical rotating machine system according to claim 1, wherein
    the at least one power converter is fixed to a position that is nearer to the internal diameter side within the first rotor in the radial direction of the first rotor than the middle point of the corresponding radius of the first rotor and/or fixed to a position that is nearer to the internal diameter side within the second rotor in the radial direction of the second rotor than the middle point of the corresponding radius of the second rotor.

14. The electrical rotating machine system according to claim 1, wherein the at least one power converter is disposed entirely inside of the first rotor.

15. The electrical rotating machine system according to claim 1, wherein the at least one power converter is disposed partially inside of the first rotor.

16. The electrical rotating machine system according to claim 1, wherein the at least one power converter is disposed entirely inside of the second rotor.

17. The electrical rotating machine system according to claim 1, wherein the at least one power converter is disposed partially inside of the second rotor.

18. The electrical rotating machine system according to claim 1, wherein the power converter has two power converters, and a capacitor is provided between the two power converters.

19. The electrical rotating machine system according to claim 18, wherein the number of magnetic poles of the first electrical rotating machine and the number of magnetic poles of the second electrical rotating machine are different.

20. A wind turbine system comprising:
an electrical rotating machine system, the electrical rotating machine system comprising
a first electrical rotating machine having
a first stator that has first stator windings, and
a first rotor that has first rotor windings and is located on the internal diameter side of the first stator so as to have a gap between the internal diameter side of the first stator and the first rotor itself
a second electrical rotating machine having
a second stator that has second stator windings, and
a second rotor that has second rotor windings and is located on the internal diameter side of the second stator so as to have a gap between the internal diameter side of the second stator and the second rotor itself; and
at least one power converter that is electrically connected to the first rotor windings and the second rotor windings, and configured to rotate when the first rotor rotates, wherein
the at least one power converter controls a switching element,
the first stator windings and the second stator windings are connected to an electric power system,
each of the stator windings are connected to an electrical power system, and
a frequency of a voltage corresponding to a difference between a voltage frequency of the power system and a rotational frequency of the first and second rotors is supplied from the at least one power converter to the first and second rotors.

21. The wind turbine system according to claim 20, further comprising:
a rotor that rotates while receiving the wind;
a nacelle that houses the electrical rotating machine system; and
a tower that supports the nacelle so that the tower enables the nacelle to revolve in the horizontal plane.

22. The wind turbine system according to claim 20, wherein the power converter has two power converters, and a capacitor is provided between the two power converters.

23. The wind turbine system according to claim 22, wherein the number of magnetic poles of the first electrical rotating machine and the number of magnetic poles of the second electrical rotating machine are different.

* * * * *